United States Patent [19]

Kozlowicz

[11] 4,214,329
[45] Jul. 29, 1980

[54] MOLDED PLASTIC BEE FEEDER

[76] Inventor: Stanley R. Kozlowicz, 4476 Tulane, Dearborn Heights, Mich. 48125

[21] Appl. No.: 27,222

[22] Filed: Apr. 5, 1979

[51] Int. Cl.³ ............................................. A01K 53/00
[52] U.S. Cl. ................................................................ 6/5
[58] Field of Search ........................................... 6/5, 1

[56] References Cited

U.S. PATENT DOCUMENTS

| 14,168 | 1/1856 | Robertson | 6/5 |
|---|---|---|---|
| 334,914 | 1/1886 | Ward | 6/5 |
| 2,567,871 | 9/1951 | Briercliffe | 6/5 |
| 3,526,913 | 9/1970 | Warner | 6/5 |
| 3,835,487 | 9/1974 | Grigg | 6/5 |
| 3,842,457 | 10/1974 | Johnson | 6/5 |

FOREIGN PATENT DOCUMENTS

| 462197 | 3/1937 | United Kingdom | 6/5 |
|---|---|---|---|
| 581253 | 10/1946 | United Kingdom | 6/5 |

*Primary Examiner*—Hugh R. Chamblee
*Attorney, Agent, or Firm*—Reising, Ethington, Barnard, Perry & Brooks

[57] ABSTRACT

A bee feeder (10) disclosed includes a molded plastic receptacle (14) that is adapted to be mounted on top of a hive body (12) and has a construction that insures rapid feeding of bees until the receptacle is emptied of liquid feed without permitting any drowning. Side walls (16, 18) of the receptacle cooperatively define a rectangular shape and a bottom wall thereof extends between the side walls with a hollow projection (22) extending upwardly therefrom and between two shorter side walls (16) spaced from two longer side walls (18). An upper opening (24) in the projection has at least a portion located inwardly from each of the side walls and covered by a grid (26) of an inverted U shape that confines the bees as they pass into the feeder through the opening and downwardly on either side of the projection to the liquid feed. Oppositely inclined portions of the bottom wall and the projection-grid construction insure complete feeding of all of the liquid feed within the feeder even when the hive body is tipped toward one of the shorter side walls to drain the hive of moisture. A central positioning rib (32) on the projection and a pair of end positioning ribs (34) cooperate to locate the grid while grooves in the bottom wall and the end positioning ribs receive edges of the grid to insure containment of the bees. Each side wall includes spaced inner and outer wall portions (42, 44) that insulate the feeder from the environment and the outer wall includes a positioning flange (48) for locating the feeder on the hive body as well as strengthening ribs (50) for reinforcing the receptacle.

15 Claims, 4 Drawing Figures

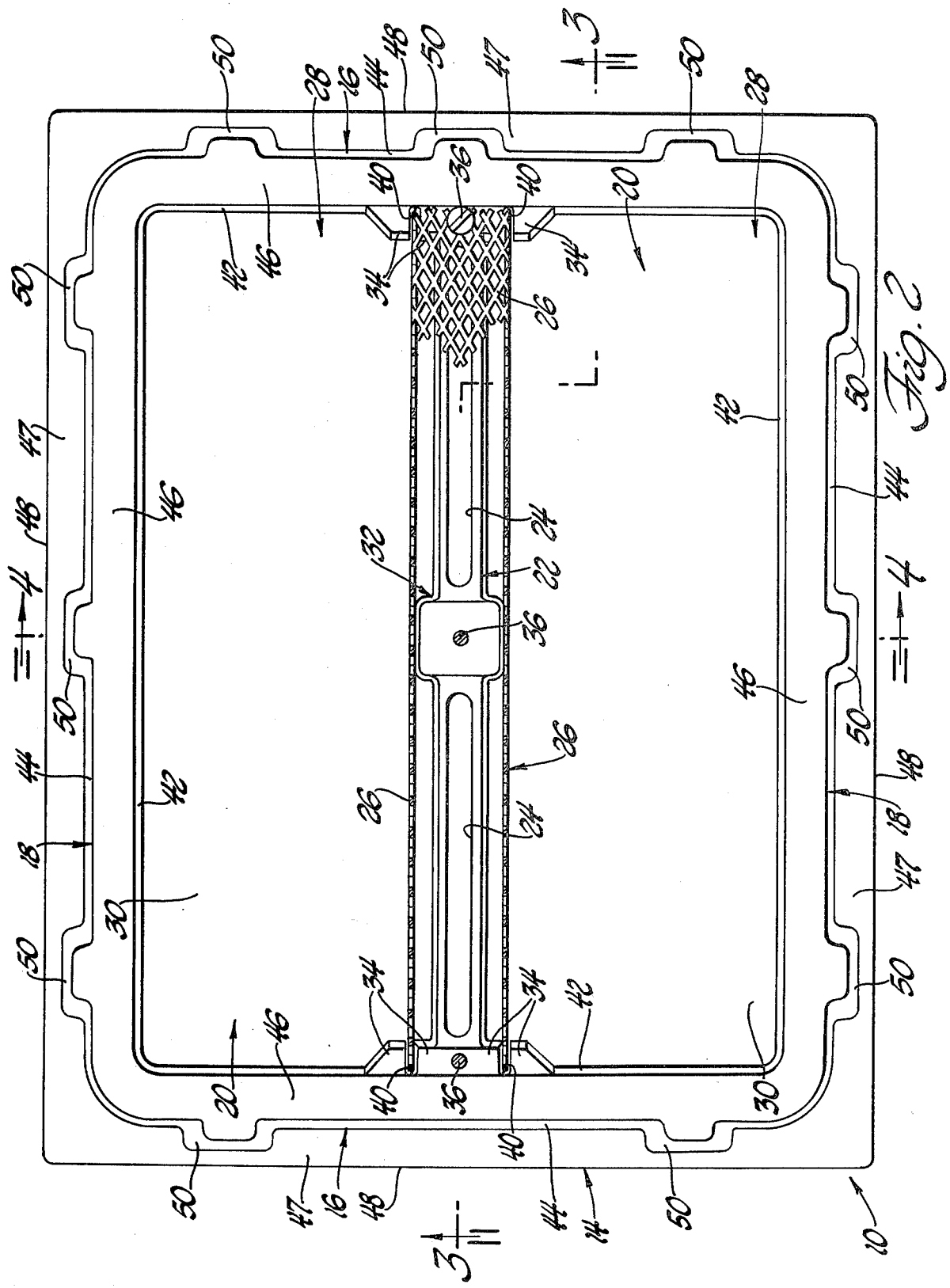

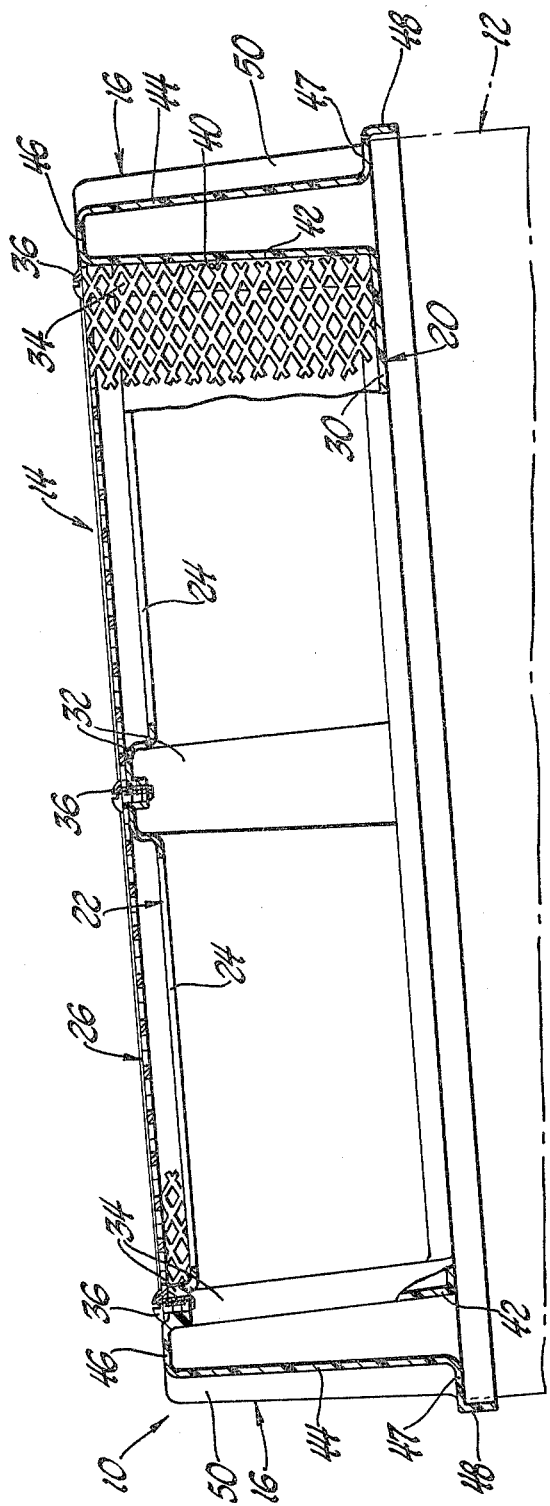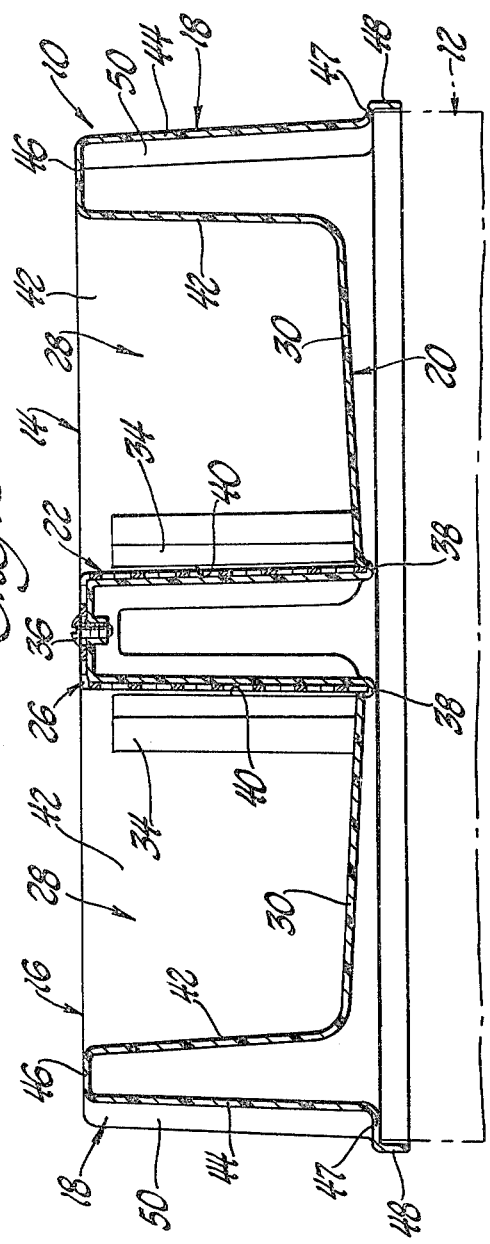

MOLDED PLASTIC BEE FEEDER

TECHNICAL FIELD

This invention relates generally to a bee feeder for domesticated bees.

BACKGROUND ART

It is well known that bee feeders can be utilized to feed domesticated bees during the early spring to increase the hive population in order to increase the annual production of honey. The queen bee and worker bees of the hive sense the level of honey that sustains the hive throughout the winter and do not allow brood rearing to drastically increase until the bees have begun to increase the supply of honey in the spring. This is done in order to insure that there will always be sufficient honey to feed the hive as bees can only live for a short period of time without honey. Since the eggs that the queen bee lays take twenty-one days to develop into a worker bee, and then another three weeks before the bee is a forager, it is desirable to feed the hive liquid feed such as sugar water in early spring to build up the population of bees to replace those that have died through the winter. Consequently, this feeding increases the number of bees in the hive well in advance of the main honey flow so as to provide a greater production of honey throughout the year.

Many problems are encountered in attempting to feed domesticated bees with prior art feeders. For example, one conventional way to feed bees is to fill a large mouthed jar with sugar water and then close the jar with a cover having holes punched in it before turning the jar upside down and placing it on top of a bee hive. Filling the jar and then maintaining it balanced in place does not sound particularly difficult until one understands that commercial beekeepers must do this operation for several hundred to as many as a thousand or more hives within a relatively short period of time in order to effectively feed the bees and thereby prematurely begin the honey production that stimulates the queen bee to start laying eggs. Also, the rate at which the bees can feed from the jars is limited by the rate at which the sugar water can flow through the holes punched in the cover as the vacuum in the upper end of the jar maintains the sugar water suspended against flow down through the holes. Inverted jars have also been utilized adjacent the entrance to the hive but such usage presents problems in that bees from other hives can feed on the sugar water and thus rob the hive being fed.

U.S. Pat. No. 3,526,913 discloses a bee feeder including a box that is mounted on an outer side of the hive body. Such a feeder is necessarily subjected to the colder nighttime temperature during the early springtime and causes the bees to cluster adjacent each other in order to keep warm rather than continuing to feed throughout the night. This nighttime stoppage can be a problem when one remembers that the beekeeper must rapidly feed many hives and does not want to have to have a separate feeder for each hive.

U.S. Pat. No. 3,978,534 discloses a bee feeder that is mounted on top of the hive body beneath the conventional top cover. This feeder is made from wood and includes a reservoir with a bottom board that slopes downwardly toward a baffle which has openings to a trough where feeding takes place. The baffle confines the bees to the trough to prevent them from drowning in the liquid feed within the reservoir.

U.S. Pat. Nos. 3,835,487 and 3,842,457 disclose molded plastic section board feeders that are mounted within the hive body suspended like the section boards where honey production is normally stored by the bees prior to removal by the beekeeper during harvesting. Both of these bee feeders are limited in the amount of feed that can be supplied at any one filling to something on the order of a gallon or less and do not provide any absolute prevention against drowning as the bees feed.

Another prior art bee feeder heretofore utilized was made from wood with a box-like construction designed to be mounted on top of the hive. A center opening in the bottom of this bee feeder had a square wood column extending upwardly surrounded by a screen spaced therefrom and capped by a suitable cover that confined the bees to the space between the screen and the square column. While this feeder was desirable in that is prevented drowning, the wood construction of the feeder made it difficult to manufacture and time consuming for the beekeeper to maintain it in repair when nails or staples began to come out after use for some period of time. Also, hive bodies are normally tipped so that moisture will not collect within the hive and this tipping caused the liquid feed to be positioned away from the screen enclosed wood column so that the bees could not empty the feeder.

DISCLOSURE OF INVENTION

An object of the present invention is to provide an improved bee feeder of a molded plastic construction that is adapted to be mounted on top of a hive body and has sufficient capacity to feed the hive in one feeding while preventing drowning and insuring complete emptying of the feeder in a relatively short period of time.

In carrying out the above object, the bee feeder includes a molded plastic receptacle having a unitary construction including side walls that cooperatively define a rectangular shape and a bottom wall that extends between the side walls to define an upwardly opening configuration for receiving liquid feed. A hollow projection extends upwardly from the bottom wall within the interior of the receptacle and has an upper opening through which bees pass between the feeder and the hive body. At least a portion of the opening is located inwardly from each of the side walls so that the bees are not subjected to the nighttime cold that can cause them to cluster for warmth and quit feeding. A grid covers the opening in the upwardly extending projection and extends downwardly to the bottom wall and horizontally to at least one of the side walls so that the bees have access from the projection opening to the feed with the hive body tipped toward the one side wall. The spacing between the grid and the projection is just large enough so that the bees can pass therebetween while always being close enough to the grid in order to crawl up out of the liquid feed so as not to drown.

In its preferred construction, the feeder receptacle has a rectangular shape that is elongated in one direction so as to correspond in size to a conventional hive body. The projection having the opening through which the bees pass into the feeder extends between the two shorter side walls of the receptacle in a spaced relationship to the two longer side walls so as to define a pair of separate compartments for receiving the liquid feed. The grid covers the upwardly extending projection and has an inverted U-shape that is positioned over the projection extending downwardly to the bottom wall on each side of the projection and horizontally to each of the shorter side walls. Oppositely inclined portions of the bottom wall extend between the longer side walls and the upwardly extending projection so that the liquid feed remains adjacent the grid that confines the bees until the bees have emptied both compartments of the receptacle.

At least one positioning rib on the projection is preferably provided to space the grid from the projection so that the bees can enter and leave the feeder through the upper opening in the projection and have access to the compartments of the receptacle in which the liquid feed is held. A central positioning rib for the grid is provided in the preferred construction with a pair of the openings in the projection on opposite sides thereof and a pair of end positioning ribs for the grid adjacent the two shorter side walls. Each inclined portion of the receptacle bottom wall includes an associated groove adjacent the upwardly extending projection and each end positioning rib has a pair of grooves on opposite sides of the projection such that edges of the grid are respectively received within the grooves to cooperate with the ribs in locating the grid and containing the bees.

Each of the side walls includes spaced inner and outer wall portions so as to insulate the interior of the feeder from the environment and thereby help in insuring continuous feeding even during the nighttime cold. The outer wall portion of each side wall has a lower positioning flange that locates the feeder on the hive body. Each outer wall portion of the side walls also preferably includes one or more strengthening ribs for reinforcing the receptacle construction.

A highly effective feeder that is easy to use as well as economical to manufacture by plastic injection molding is thus provided by the present invention whose objects, features, and advantages can be further understood from the following detailed description of the best mode for carrying out the invention with reference to the accompanying drawings.

BRIEF DESCRIPTION OF DRAWINGS

FIG. 2 is a top plan view of the bee feeder taken along line 2—2 of FIG. 1 with a grid thereof broken away for clarity;

FIG. 3 is a sectional view taken along line 3—3 of FIG. 2 illustrating the orientation of the feeder when mounted on top of a tipped hive body; and FIG. 4 is a sectional view through the bee feeder taken along line 4—4 of FIG. 2.

BEST MODE FOR CARRYING OUT THE INVENTION

Figure 1:
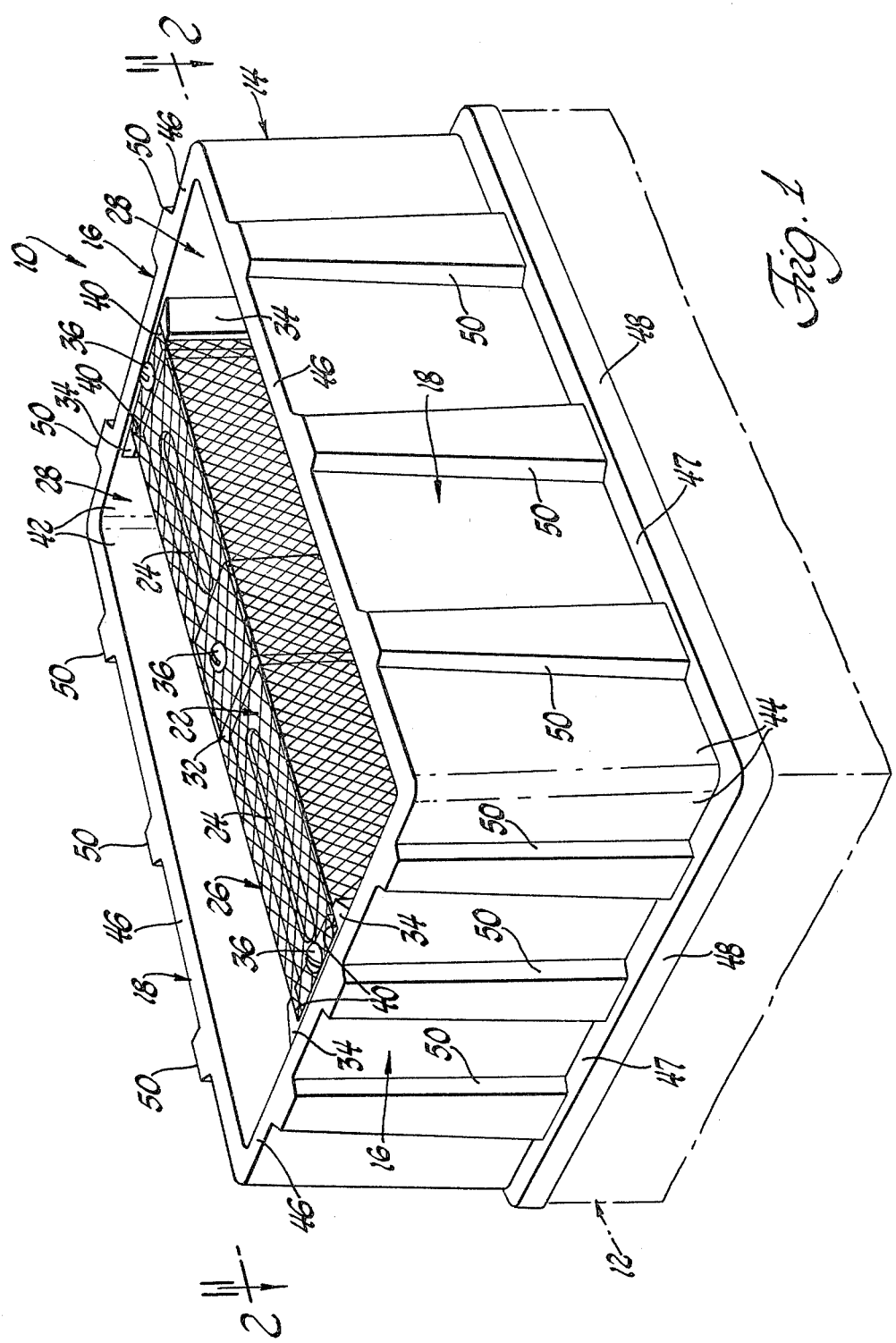
FIG. 1 is a perspective view that illustrates a molded plastic bee feeder constructed according to the present invention.

Referring to FIG. 1 of the drawings, a bee feeder constructed in accordance with the present invention is indicated generally by reference numeral 10 and shown mounted on top of a phantom line indicated hive body 12. Prior to placement of the feeder 10 on the hive body 12, the conventional cover of the hive is removed so that the bees will have access to the feeder in a manner which is hereinafter described. The cover is preferably placed over the top of the feeder 10 after filling with a suitable liquid feed such as sugar water so as to prevent robbing of the feeder by bees from other hives.

Bee feeder 10 illustrated in FIG. 1 includes a receptacle 14 that is injection molded from plastic to have a unitary construction. The preferred plastic for injection molding the receptacle is polyethylene of a black color so as to resist ultraviolet deterioration as well as absorb warmth from the sun. Receptacle 14 has a rectangular shape that is longer in one direction than the other as cooperatively defined by a pair of shorter side walls 16 and a pair of longer side walls 18 of the receptacle. Side walls 16 and 18 and a bottom wall 20 (FIG. 4) cooperatively provide an upwardly opening configuration for receiving liquid feed on which bees from the hive body 12 feed. Such feeding prematurely begins honey production that stimulates the queen bee to start egg laying so as to increase the hive population and hence the yearly production of honey. A hollow projection 22 of the receptacle extends upwardly from the bottom wall and has a pair of upper openings 24 through which bees pass between the feeder and the hive body. A grid 26 covers each projection opening 24 and extends downwardly to the bottom wall 20 and between the two shorter side walls 16 on each side of the projection in a spaced relationship thereto as is hereinafter described. The bees thus have access from the projection openings 24 to the feed within the receptacle in order to provide emptying thereof even when the hive body is tipped toward one of the shorter side walls 16 as shown in FIG. 3.

As best seen in FIGS. 2 and 4, the side walls 16 and 18 cooperate with the bottom wall 20 to define a pair of separate compartments 28 in which the liquid feed is received. When constructed for a conventional size hive body of sixteen inches by twenty inches and having a height of approximately eight inches, the receptacle 14 can hold slightly over one and a half gallons of liquid feed in each of the compartments 28 so as to provide a sufficient quantity to feed a hive without requiring any refilling. On each side of the projection 22, the bottom wall 20 of the receptacle includes oppositely inclined portions 30 that are best seen in FIG. 4 and extend downwardly toward the center of the receptacle so that the liquid feed remains adjacent the grid 26 as the bees empty each of the compartments 28. Such is the case even if the hive body 12 is tipped slightly sideways toward one of the longer side walls 18 of the feeder receptacle.

Grid 26 has an inverted U shape best seen in FIG. 4 and is positioned with respect to the projection openings 24 by a central positioning rib 32 located between the ends of the projection and a pair of end positioning ribs 34 adjacent the shorter side walls 16 as best seen in FIGS. 2 and 3. Each of the ribs 32 and 34 extends upwardly above the rest of the projection 22 adjacent the openings 24 as well as horizontally with respect thereto so as to space the grid 26 from the rest of the projection by about three-eighths of an inch. This spaced relationship of the grid with respect to the projection 22 allows the bees to pass upwardly through either of the openings 24 and then downwardly between the grid and the projection in order to feed on the liquid within the adjacent compartment 28. Spacing the grid 26 from the projection by three-eighths of an inch insures that the bees are always positioned sufficiently close to the grid 26 so that they can climb upwardly on the grid in order to prevent drowning. Inner ends of each of the openings 24 are positioned inwardly from each of the side walls 16 and 18 so that the bees can pass into the receptacle for feeding without having to pass adjacent the periphery of the feeder where the cooler temperatures of the nighttime atmosphere might cause the bees to cluster and stop feeding. Nevertheless, when the hive body 12 is tipped as shown in FIG. 3 in a normal fashion to drain moisture from the hive, the bees have access to both compartments 28 adjacent the left ends thereof through the left opening 24 in order to permit emptying of both compartments as allowed by the inclined bottom wall portions 30 and the projection and grid construction of the feeder.

Grid 26 can be made from screen or expanded metal lath or any other construction with spaced openings whose size preferably is no greater than one-eighth inch in order to confine the bees while still allowing the liquid feed to flow into the space between the grid and projection for feeding. Three screws 36 are threaded into the central and end positioning ribs 32 and 34 in order to removably secure the grid in position. Upon removal of the screws 36, the grid 26 can be lifted upwardly and removed for cleaning. In its mounted condition with the screws 36 in place, the lower edges of the grid are received within grooves 38 in the bottom wall portions 30 adjacent the junctions thereof with the projection 22 on the opposite side of the projection as best seen in FIG. 4. End edges of the grid 26 are likewise received within grooves 40 in the end positioning ribs 34 so as to cooperatively position the grid as well as confine the bees as they feed on the liquid feed within the compartments 28.

As best seen in FIGS. 3 and 4, each of the side walls 16 and 18 includes spaced inner and outer wall portions 42 and 44 that are joined by a top rim portion 46 extending about the liquid feed compartments 28. Spaced wall portions 42 and 44 insulate the interior of the feeder from the colder nighttime atmosphere so that the bees continue to feed through the night rather than clustering to keep warm. At its lower extremity, each outer side wall 44 includes a horizontal flange 47 that rests on top of the hive body 12 and a positioning flange 48 that extends downwardly from the horizontal flange so as to engage the hive body in order to locate the feeder 10. Outer wall portions 44 of the side walls also include strengthening ribs 50 that extend upwardly as best seen in FIG. 1 from the adjacent horizontal flange 47 to adjacent the rim portion 46 that extends about the liquid feed compartments.

It should be understood that the feeder 10 can also be utilized with solid feed by removing the grid 26 and placing cakes of solid feed within the compartments on each side of the projection 22.

While the best mode for carrying out the invention has herein been described in detail, those familiar with the art to which this invention relates will recognize various alternative designs and embodiments for practicing the invention as defined by the following claims.

What is claimed is:

1. A bee feeder comprising a molded plastic receptacle adapted to be mounted on top of a hive body, the receptacle including side walls cooperatively defining a rectangular shape and a bottom wall that extends between the side walls to define an upwardly opening configuration for receiving liquid feed, a hollow projection that extends upwardly from the bottom wall within the interior of the receptacle such that bees can pass upwardly and downwardly through the bottom wall through the projection, the projection defining an upper opening through which bees pass between the feeder and the hive body, said opening having at least a portion thereof located inwardly from each of the side walls, and a grid that covers the projection opening in a spaced relationship thereto extending downwardly to the bottom wall in a spaced relationship to the projection so as to provide bees access to the feed.

2. A bee feeder comprising a molded plastic receptacle having a unitary construction and adapted to be mounted on top of a hive body, the receptacle including side walls cooperatively defining a rectangular shape and a bottom wall that extends between the side walls to define an upwardly opening configuration for receiving liquid feed, a hollow projection that extends upwardly from the bottom wall within the interior of the receptacle such that bees can pass upwardly and downwardly through the bottom wall through the projection, the projection defining an upper opening through which bees pass between the feeder and the hive body, said opening having at least a portion thereof located inwardly from each of the side walls, and a grid that covers the projection opening in a spaced relationship thereto extending downwardly to the bottom wall and horizontally to at least one of the side walls in a spaced relationship to the projection so as to provide the bees access to the feed with the hive body tipped toward said one side wall.

3. A bee feeder as in claim 2 wherein two of the side walls of the receptacle have a shorter length than the other two side walls, the projection extending between said two shorter side walls in a spaced relationship to the two longer side walls so as to define a pair of separate compartments for receiving the liquid feed, and the grid having an inverted U shape positioned over the projection.

4. A bee feeder as in claim 3 wherein the bottom wall includes oppositely inclined portions that extend between the longer side walls and the projection so that the liquid feed remains adjacent the junction of the projection with the bottom wall until the receptacle is emptied.

5. A bee feeder as in claim 4 wherein the projection includes at least one positioning rib that provides the spaced relationship of the grid from the projection and the opening thereof so that the bees can enter and leave the feeder through the projection opening and have access to the feed in the compartments of the receptacle.

6. A bee feeder as in claim 5 wherein the projection includes one central positioning rib for the grid, a pair of openings defined in the projection on opposite sides of the central positioning rib, and a pair of end positioning ribs for the grid adjacent the two shorter side walls.

7. A bee feeder as in claim 6 wherein each inclined portion of the receptacle bottom wall includes an associated groove adjacent the upwardly extending projection, each end positioning rib having grooves on opposite sides of the projection, and the grid having edges respectively received within the grooves to locate the grid.

8. A bee feeder as in claims 1, 2, or 7 wherein each side wall includes spaced inner and outer wall portions so as to insulate the interior of the feeder from the environment.

9. A bee feeder as in claim 7 wherein the outer wall portion of each side wall includes a positioning flange for locating the feeder on the hive body.

10. A bee feeder as in claim 9 wherein the outer wall portions of the side walls also include strengthening ribs.

11. A bee feeder comprising a molded plastic receptacle adapted to be mounted on top of a hive body, the receptacle including side walls cooperatively defining a rectangular shape that is longer in one direction than the other, a bottom wall that extends between the side walls of the receptacle to define an upwardly opening configuration, a hollow projection that extends upwardly from the bottom wall and between the two shorter side walls in a spaced relationship to the two longer side walls so as to define a pair of separate compartments for receiving liquid feed and such that bees can pass upwardly and downwardly through the bottom wall through the projection, the projection defining an upper opening through which bees pass between the feeder and the hive body, said opening having at least a portion thereof located inwardly from each of the side walls, and a grid of an inverted U shape that covers the upwardly extending projection in a spaced relationship to the opening thereof extending downwardly to the bottom wall and between the shorter side walls in a spaced relationship to the projection so as to provide the bees access from the projection opening to the feed with the hive body tipped toward one of the shorter side walls.

12. A bee feeder comprising a molded plastic receptacle having a unitary construction and adapted to be mounted on top of a hive body, the receptacle including side walls cooperatively defining a rectangular shape that is longer in one direction than the other, a bottom wall that extends between the side walls of the receptacle to define an upwardly opening configuration, a hollow projection that extends upwardly from the bottom wall and between the two shorter side walls in a spaced relationship to the two longer side walls so as to define a pair of separate compartments for receiving liquid feed and such that bees can pass upwardly and downwardly through the bottom wall through the projection, the bottom wall including portions that are inclined in opposite directions toward the projection, the projection defining an upper opening through which bees pass between the feeder and the hive body, said opening having at least a portion thereof located inwardly from each of the side walls, and a grid of an inverted U shape that covers the upwardly extending projection in a spaced relationship to the opening thereof extending downwardly to the bottom wall and between the shorter side walls in a spaced relationship to the projection so as to provide the bees access from the projection opening to the feed with the hive body tipped toward one of the shorter side walls.

13. A bee feeder comprising a molded plastic receptacle having a unitary construction and adapted to be mounted on top of a hive body, the receptacle including side walls cooperatively defining a rectangular shape that is longer in one direction than the other, each side wall including inner and outer wall portions so as to insulate the interior of the feeder from the environment, a bottom wall that extends between the inner wall portions of the side walls to provide the receptacle with an upwardly opening configuration, a hollow projection that extends upwardly from the bottom wall and between the two shorter side walls in a spaced relationship to the two longer side walls so as to define a pair of separate compartments for receiving liquid feed and such that bees can pass upwardly and downwardly through the bottom wall through the projection, the bottom wall including portions that are inclined in opposite directions toward the projection, the projection defining an upper opening through which bees pass between the feeder and the hive body, said opening having at least a portion thereof located inwardly from each of the side walls, and a grid of an inverted U shape that covers the upwardly extending projection in a spaced relationship to the opening thereof extending downwardly to the bottom wall and between the shorter side walls in a spaced relationship to the projection so as to provide the bees access from the projection opening to the feed with the hive body tipped toward one of the shorter side walls.

14. A bee feeder comprising a molded plastic receptacle having a unitary construction and adapted to be mounted on top of a hive body, the receptacle including side walls cooperatively defining a rectangular shape that is longer in one direction than the other, a bottom wall that extends between the side walls of the receptacle to define an upwardly opening configuration, a hollow projection that extends upwardly from the bottom wall and between the two shorter side walls in a spaced relationship to the two longer side walls so as to define a pair of separate compartments for receiving liquid feed and such that bees can pass upwardly and downwardly through the bottom wall through the projection, the bottom wall including portions that are inclined in opposite directions toward the projection, the projection including a central positioning rib and a pair of end positioning ribs as well as defining a pair of openings respectively located between the central positioning rib and the end positioning ribs, said openings each being located at the upper extremity of the projection such that bees pass therethrough between the feeder and the hive body, each opening having at least a portion thereof located inwardly from each of the side walls, and a grid of an inverted U shape that covers the upwardly extending projection and is located by the positioning ribs thereof in a spaced relationship to the openings extending downwardly to the bottom wall in a spaced relationship to the rest of the projection in order to provide the bees access to the feed with the hive body tipped toward one of the shorter side walls.

15. A bee feeder comprising a molded plastic receptacle having a unitary construction and adapted to be mounted on top of a hive body, the receptacle including side walls cooperatively defining a rectangular shape that is longer in one direction than the other, each side wall including inner and outer wall portions so as to insulate the interior of the feeder from the environment, the outer wall portions of the side walls including positioning flanges for locating the feeder on the hive body and stengthening ribs for reinforcing the receptacle, a bottom wall that extends between the inner wall portions of the side walls to provide the receptacle with an upwardly opening configuration, a hollow projection that extends upwardly from the bottom wall and between the two shorter side walls in a spaced relationship to the two longer side walls so as to define a pair of separate compartments for receiving liquid feed and such that bees can pass upwardly and downwardly through the bottom wall through the projection, the bottom wall including portions that are inclined in opposite directions toward the projection and having grooves located adjacent thereto, the projection including a central positioning rib and a pair of end positioning ribs as well as defining a pair of openings respectively located between the central positioning rib and each end positioning rib, the end positioning ribs each including a pair of grooves on opposite sides of the projection, said openings each being located at the upper extremity of the projection such that bees pass therethrough between the feeder and the hive body, each opening having an elongated shape so as to include an inner end located inwardly from each of the side walls, a grid of an inverted U shape that covers the upwardly extending projection and is located by the positioning ribs thereof in a spaced relationship to the openings extending downwardly to the bottom wall in a spaced relationship to the rest of the projection in order to provide the bees access to the feed with the hive body tipped toward one of the shorter side walls, and the grid having edges that are received within the grooves in the bottom wall and the end positioning ribs so as to confine the bees and locate the grid.

* * * * *